United States Patent [19]

Pagilagan

[11] 4,076,664

[45] Feb. 28, 1978

[54] 612 OR 610/6I OR 6T/636 POLYAMIDE TERPOLYMER

[75] Inventor: Rolando Umali Pagilagan, Parkersburg, W. Va.

[73] Assignee: E. I. Du Pont de Nemours and Company, Wilmington, Del.

[21] Appl. No.: 631,692

[22] Filed: Nov. 13, 1975

[51] Int. Cl.$^2$ .............................................. C08G 69/26
[52] U.S. Cl. ............................ 260/18 N; 260/33.4 R; 260/78 R; 260/78 S
[58] Field of Search ............................ 260/78 R, 18 N

[56] References Cited

U.S. PATENT DOCUMENTS 3,647,761    3/1972    Ridgway et al. .................. 260/78 R Primary Examiner—Harold D. Anderson

[57] ABSTRACT

A terpolyamide resin having components of nylon 612 or 610, nylon 6I or 6T (wherein I is an isophthalic acid moiety and T is a terephthalic acid moiety) and nylon 69, 610, 636, or 612 is provided; the terpolyamide is especially resistant to zinc chloride and is useful for making molded articles and extruded shapes such as flexible tubing.

3 Claims, No Drawings

612 OR 610/6I OR 6T/636 POLYAMIDE TERPOLYMER

FIELD OF THE INVENTION

The present invention relates to polyamide copolymers. More particularly, the present invention is directed to polyamide terpolymers, hereinafter referred to as terpolyamide resins.

BACKGROUND OF THE INVENTION

Many classes of polyamide resins, commonly referred to as nylon, are known. One class of such polyamides is ordinarily obtained by a polycondensation reaction between a polybasic acid and a polyamine. For instance, the polycondensation reaction between adipic acid and hexamethylene diamine yields polyhexamethylene adipamide which is commonly referred to as nylon 66. Such polyamide resins in the form of shaped objects have been found to be useful in numerous applications, e.g., flexible tubing. A principle disadvantage and drawback of the polyamide resins is the lack of resistance to degradation occasioned by contact with zinc chloride. Specifically, exposure to zinc chloride will result in deterioration and degradation of shaped articles molded from polyamide resins as evidenced by extensive cracks that appear and form throughout such shaped articles. It has been observed that resistance to zinc chloride appears to be related to the number of carbon atoms of the amide group in the polymer chain. That is, the resistance to zinc chloride increases as the number of carbon atoms between each pair of repeating amide groups of the polymer chain increases. To illustrate, nylon 6 and nylon 66 are more sensitive to zinc chloride than nylon 612 which is, in turn, more sensitive than nylon 11 and nylon 12. Attempts have been made to increase the zinc chloride resistance of polyamide resins. For example, British Patent Specification No. 1,367,840 describes a polyamide copolymer having increased zinc chloride resistance that is obtained by copolymerizing from 0.5 to 15% by weight of a dimerized salt of the formula $$HOOC-R-COOH \cdot H_2N-R'-NH_2$$

wherein R and R' are saturated hydrocarbon radicals having from 25 to 50 carbon atoms and a polyamide-forming monomer. Long carbon-chain salts such as the foregoing and long carbon-chain dicarboxylic acids and lactams used heretofore to provide zinc chloride-resistant polyamides are, however, quite expensive. Accordingly, it is the principal object of the present invention to provide specific polyamide resins that are zinc-chloride resistant and more economical.

THE INVENTION

According to the present invention, there is provided a terpolyamide resin having the following repeating segments

wherein X is 8 or 10;

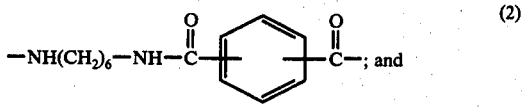

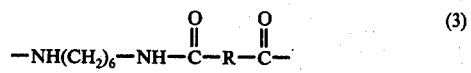

wherein R is a hydrocarbon radical having 7, 8, 10 or 34 carbon atoms distributed therein, wherein said resin has an inherent viscosity of at least 1.0 and segment (1) is present in an amount up to 80% by weight, based upon the resin weight, segment (2) is present in an amount between about 15% and about 25% by weight, based upon the resin weight, and segment (3) is present in an amount between about 3% and about 10% by weight, based upon the resin weight.

In one embodiment, the terpolyamide resin has up to 75% by weight, based upon the resin weight, of segment (1), between about 15% and about 20% by weight based upon the resin weight, of segment (2), and between about 5% and about 10% by weight, based upon the resin weight, of segment (3).

DETAILED DESCRIPTION

The nature and advantages of the present invention will be more clearly understood by the following description thereof.

The terpolyamide resin of the present invention is characterized by having present therein in a repeating manner the following segments:

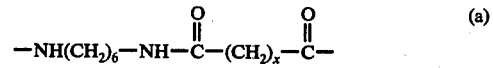

wherein X is 8 or 10;

wherein R is a hydrocarbon radical having 7, 8, 10 or 34 carbon atoms. Segment (a) is commonly referred to as nylon 610 or 612 obtained by polycondensing hexamethylene diamine and sebacic acid or dodecanedioic acid. Segment (b) is commonly referred to as nylon 6I or 6T and is obtained by polycondensing hexamethylene diamine with isophthalic acid, terephthalic acid or both. Segment (c) is commonly referred to as either nylon 69, nylon 610, nylon 612 or nylon 636 (depending upon the number of in-chain carbon atoms of each of the diamine moiety and the dicarboxylic acid moiety of the polymer segment) and is obtained by polycondensing hexamethylene diamine and one or more of azelaic acid, sebacic acid, dodecanedioic acid and dimer acid. Segment (a) of the terpolyamide constitutes up to 80% by weight of the terpolyamide resin and in a preferred embodiment constitutes between about 75 and 80% by weight of the terpolyamide resin. Segment (b) constitutes between about 15% and about 20% by weight of the terpolyamide resin. Segment (c) constitutes between about 3% and about 10%, preferably between about 5% and about 10%, by weight of the terpolyamide resin.

The terpolyamide resin of the present invention is obtained by reacting aqueous salt solutions of the above described polymer segments at a temperature usually below 300° C., e.g., 200° C. to 280° C., and a pressure usually below 300 psig, e.g., 180 psig to 250 psig, for a suitable time usually less than two hours. When most of the water is evaporated, the pressure is gradually bled to atmospheric and the reaction is allowed to continue either under atmospheric conditions or under vacuum. The choice of conditions will depend on the desired molecular weight of the resin. For instance, a terpolyamide of 80 weight percent nylon 612 segments, 15 weight percent nylon 6I segments, and 5 weight percent nylon 69 segments can be prepared by introducing an aqueous solution containing 53.6 parts by weight of nylon 612 salt, an aqueous solution containing 10.3 parts by weight of nylon 6I salt and an aqueous solution containing 3.4 parts by weight of nylon 69 salt into an autoclave followed by heating the contents of the autoclave to 200° C. and a pressure of 180 psig. The water is slowly bled off while maintaining the pressure at 180 psig until the salts are concentrated and the temperature has reached 246° C. The pressure is then slowly reduced to atmospheric and 13.1 parts by weight of Santicizer ® 8 is then added. The temperature of the polymer is then allowed to rise to 270° C. and vacuum is applied on the polymer until the desired molecular weight is attained.

The salts of nylon 69, 610, 612, 6I, 6T, or 636 can be obtained by known methods which form no part of this invention. For example, nylon 612 salt can be prepared by mixing 13.4 parts by weight of hexamethylene diamine with 60 parts by weight of water after which 26.6 parts by weight of dodecanedioic acid is added. The mixture is agitated and heated to about 70° C. to maintain the nylon 612 salt in solution. The pH of the salt solution is measured and adjusted to between 7.3 and 8.6 by adding either dodecanedioic acid or hexamethylene diamine. The actual pH used will depend on the amount of hexamethylene diamine that is lost during the polymerization. The concentration of the nylon 612 salt in the resulting solution can be calculated from the amount of dodecanedioic acid used in the preparation. Normally, the concentration of the nylon 612 salt is about 40% by weight.

Salts of nylon 69, 610, 6I and 6T are prepared similarly as the salt of nylon 612. Because of the lower solubility of nylon 6I and 6T salts, a 30 weight percent salt concentration is used in the preparation of these nylon salts. For instance, a 30 weight percent nylon 6T salt is prepared by mixing 70 parts by weight of water, 12.3 parts by weight of hexamethylene diamine and 17.7 parts by weight of terephthalic acid. The mixture is agitated and heated to about 70° C. The pH of the nylon salt solution is then measured and adjusted to between 7.3 and 8.6 by adding either hexamethylene diamine or terephthalic acid. The actual concentration of the nylon salt solution can be calculated from the amount of terephthalic acid used in the preparation. The nylon 6I salt is prepared by using isophthalic acid in lieu of the terephthalic acid.

For convenience, it may be desired to prepare all the nylon salts simultaneously, and this can be accomplished by reacting hexamethylene diamine with a mixture of the acids in the proper proportions. This method is more desirable when one of the nylon salt components is nylon 636 salt. The nylon 636 salt has a much greater tendency to form foam and lower solubility in water than nylon 6T or 6I salt. An alternate method for the preparation of nylon 636 salt is to use methanol as a solvent. This method is described in British Pat. No. 1,367,840.

The preparation of the terpolyamide resin of the invention can be conducted in the presence of a catalyst system comprising compounds of phosphorus such as orthophosphoric acid.

The preparation of the terpolyamide resin of the invention is preferably conducted in the presence of monofunctional acids to control the molecular weight. For instance, up to 0.2 weight percent of acetic acid, preferably below 0.06 weight percent, may be used.

The preparation of the terpolyamide resin of the invention is preferably conducted in an aqueous solvent system.

The preparation of the terpolyamide resin of the invention can proceed within a broad temperature range. For example, the preparation can be conducted as low as 200° C. to as high as about 300° C. The specific reaction temperature employed initially and the course of the reaction temperature will depend to some extent upon the melting point of the terpolyamide resin and the selection of process conditions such as, for example, the particular nylon salts that are employed, the molecular weight of the terpolyamide, etc., as will readily be understood by anyone skilled in the art.

The preparation of the terpolyamide resin of the invention can be carried out at any convenient pressure. Preferably, the preparation is carried out at a pressure between 180 psig and 250 psig.

The molecular weight of the terpolyamide resin of the invention is sufficiently high that it can be molded into shaped articles. The terpolyamide resin can be cut into small pellets that are suitable for molding.

The inherent viscosity of the terpolyamide resin is at least about 1.0, when measured in a solution of the terpolyamide resin in m-cresol at 25° C. Inherent viscosity data is obtained by measuring the viscosity of the terpolyamide solution relative to that of the solvent alone, and inherent viscosity is calculated from the following equation $$\text{Inherent Viscosity} = \frac{\text{Natural Logarithum}\left(\frac{\text{Viscosity of Terpolyamide Solution}}{\text{Viscosity of Solvent}}\right)}{C}$$

wherein C is the concentration expressed in grams of terpolyamide resin per 100 milliliters of solution. The terpolyamide solution is obtained by dissolving 0.5 gram of the terpolyamide in an initial amount of solvent less than 100 mls. at 50° C., and then adjusting the total solution to 100 mls. by adding additional solvent at 25° C. As is known in the polymer art, inherent viscosity is directly related to the molecular weight of polymers.

The terpolyamide resin molding pellets can be surface coated with suitable lubricants in order to facilitate the molding thereof. For instance, 0.09% by weight, based upon the terpolyamide resin weight, of aluminum distearate can be coated onto the terpolyamide resin molding pellets. Suitable additives such as heat stabilizers, e.g., potassium iodide and cuprous iodide, can be added to the terpolyamide resin. As an example, 0.35 weight percent of potassium iodide and 0.05 weight percent cuprous iodide, based upon the weight of the terpolyamide resin may be used. When required by end-use applications, ultraviolet light absorbers can be added. Typically, about 0.2 weight percent, based on the terpolyamide resin, of benzotriazole derivatives such as 2(2'hydroxy-5'-methylphenyl)benzotriazole can be used. Commercially available anti-oxidants which are derivatives of phenols and aromatic amines may also be used in concentrations up to 0.5 weight percent, based upon the terpolyamide resin. Dyes and pigments such as carbon black and titanium dioxide may also be present in an amount of up to 0.2 weight percent, based upon the terpolyamide resin. Furthermore, nucleating agents such as talc may be present in concentrations up to 0.2 weight percent, based upon the terpolyamide resin.

The terpolyamide resin of the invention may also contain plasticizers. For instance, up to 18 weight percent, preferably 10 to 15%, of butylbenzene sulfonamide or N-ethyl toluene sulfonamide may be added.

The principle and practice of the invention will be illustrated herebelow by the following Examples which are only exemplary thereof and it is not intended that the invention be limited thereto since modifications in technique and operation will be apparent to anyone skilled in the art. All parts and percentages expressed in the following Examples are by weight unless otherwise indicated.

The terpolyamide resins of the invention prepared in the following Examples were subjected to the following tests:

ZINC CHLORIDE TEST

Molded specimens of terpolyamide resin having a rectangular form and a length of 5 inches, a width of one-half inch and a thickness of one-eight inch were bent around the surface of a mandrel having a diameter of one inch and secured thereto. Each bent specimen was immersed in a 50% aqueous zinc chloride solution and inspected periodically to determine its resistance to zinc chloride.

EXAMPLE 1

A terpolyamide resin having an inherent viscosity of 1.45 and containing 80 weight percent of nylon 612 segments, 15 weight percent of nylon 6I segments, and 5 weight percent of nylon 69 segments was prepared as described below.

53.6 parts by weight of nylon 612 salt having a concentration of 40.0 weight percent was charged into an agitated tank. Thereafter, 72 parts by weight of water and 5.6 parts by weight of hexamethylene diamine having a concentration of 80 weight percent were added to the tank. To the mixture of nylon salt was added 2.1 parts by weight of azelaic acid and 6.1 parts by weight of isophthalic acid. The resulting mixture of nylon salts was then heated to about 70° C. The pH of the mixture of nylon salts was measured and adjusted to 8.75 by adding additional amounts of hexamethylene diamine. 6 Milliliters of Dow Corning ® antifoam FG-10 emulsion was then added and the mixture of nylon salts was charged into an autoclave after which it was heated to 200° C. and a pressure of 180 psig in about 10 minutes. For 75 minutes the water in the form of steam was allowed to escape while maintaining pressure in the autoclave at 180 psig. When the temperature of the polymer reached 246° C., the pressure in the autoclave was then slowly reduced within 58 minutes to atmospheric pressure. 13.1 Parts by weight of Santicizer ® 8 (Santicizer ® 8 is a registered trademark for a mixture of N-ethyl and p-toluenesulfonamide manufactured by Monsanto Co.) was added and the terpolyamide was held for 35 minutes at atmospheric pressure and the temperature was allowed to rise to 268° C. Vacuum was then applied to the terpolyamide for 24 minutes; during this step the temperature of the batch rose to 270° C. The terpolyamide resin was then extruded through a die, quenched in cold water, and cut into small pellets. The pellets were then surface coated with 0.2 weight percent octylene glycol, followed by 0.35 weight percent potassium iodide, 0.05 weight percent cuprous iodide, and 0.05 weight percent aluminum distearate lubricant. The octylene glycol was used to facilitate adhesion of the additives onto the pellets. The terpolyamide resin pellets were then injection molded into rectangular test specimens having planar dimensions of 5 inches by ½ inch and a thickness of ⅛ inch.

Ten specimens of the terpolyamide resin moldings were tested for zinc chloride resistance as described above. All the specimens withstood 32 days immersion in 50 weight percent zinc chloride solution without exhibiting any cracks.

Analysis of the polymer showed that it contained 17.5 weight percent of the Santicizer ® 8 plasticizer.

Control Example

A homopolymer of nylon 612 plasticized with 17.1 weight percent Santicizer ® 8 and an inherent viscosity of 1.56 was prepared in accordance with the procedure described in Example 1. Five specimens were tested for zinc chloride resistance. After 3 days in 50 weight percent zinc chloride solution, all the specimens exhibited cracks. This illustrates the vulnerability of plasticized nylon 612 to zinc chloride solutions.

EXAMPLE 2

A terpolyamide resin having an inherent viscosity of 1.44 and composed of 75 weight percent nylon 612 segments, 20 weight percent nylon 6T segments, and 5 weight percent of nylon 636 and plasticized with 12.9 weight percent butylbenzenesulfonamide was prepared as in Example 1. Ten specimens of this terpolyamide were tested for zinc chloride resistance. All the specimens withstood 18 days immersion in 50 weight percent zinc chloride solution.

EXAMPLE 3

A terpolyamide resin having an inherent viscosity of 1.34 and composed of 75 weight percent of nylon 612 segments, 20 weight percent of nylon 6I segments, and 5 weight percent of nylon 636 segments and plasticized with 16.4 weight percent of Santicizer ® 8 (N-ethyltoluene sulfonamide) was prepared as in Example 1. Ten specimens of the terpolyamide resin were subjected to the zinc chloride test for 16 days. None of the specimens exhibited cracks after the 16 days of testing in the zinc chloride solution.

EXAMPLE 4

A terpolyamide resin having an inherent viscosity of 1.48 and composed of 75 weight percent of nylon 612 segments, 20 weight percent of nylon 6I segments, and 5 weight percent of nylon 636 segments and plasticized with 18.5 weight percent of butylbenzenesulfonamide was prepared in accordance with the procedure described in Example 1. Ten specimens of the terpolyamide resin were subjected to the zinc chloride test for 16 days. None of the specimens exhibited cracks after the 16 days of testing in the zinc chloride solution.

What is claimed is:

1. A terpolymer resin of sufficiently high molecular weight to be molded into shaped articles consisting essentially of the following repeating segments

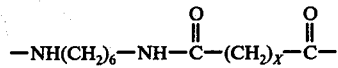 (1)

wherein X is 8 or 10;

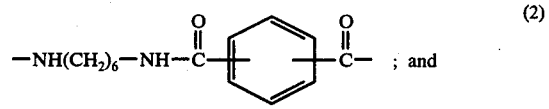

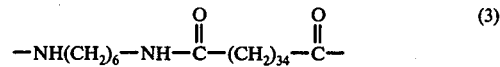

wherein segment (1) is present in an amount up to 80% by weight, based upon the resin weight, segment (2) is present in an amount between about 15% and about 25% by weight, based upon the resin weight, and segment (3) is present in an amount between about 3% and about 10% by weight, based upon the resin weight.

2. A terpolymer resin of claim 1 wherein X is 8.
3. A terpolymer resin of claim 1 wherein X is 10.

* * * * *